(12) United States Patent
Longobardo et al.

(10) Patent No.: US 7,622,410 B2
(45) Date of Patent: Nov. 24, 2009

(54) GREY GLASS COMPOSITION

(75) Inventors: Anthony V. Longobardo, Grove, MI (US); Leonid Landa, Grosse Ile, MI (US); Ksenia A. Landa, Grosse Ile, MI (US); Scott V. Thomsen, South Lyon, MI (US)

(73) Assignee: Guardian Industries Corp., Auburn Hills, MI (US)

( * ) Notice: Subject to any disclaimer, the term of this patent is extended or adjusted under 35 U.S.C. 154(b) by 733 days.

(21) Appl. No.: 11/062,741

(22) Filed: Feb. 23, 2005

(65) Prior Publication Data

US 2006/0189472 A1 Aug. 24, 2006

(51) Int. Cl.
*C03C 3/095* (2006.01)
*C03C 3/087* (2006.01)

(52) U.S. Cl. .............................. 501/71; 501/70; 501/64

(58) Field of Classification Search .................. 501/71, 501/64, 70
See application file for complete search history.

(56) References Cited

U.S. PATENT DOCUMENTS

| | | |
|---|---|---|
| 4,104,076 A | 8/1978 | Pons |
| 5,393,593 A | 2/1995 | Gulotta et al. |
| 5,656,560 A | 8/1997 | Stötzel et al. |
| 5,728,471 A | 3/1998 | Dupont et al. |
| 5,877,102 A | 3/1999 | DuPont et al. |
| 5,877,103 A | 3/1999 | Dupont et al. |
| 5,932,502 A | 8/1999 | Longobardo et al. |
| 6,114,264 A | 9/2000 | Krumwiede et al. |
| 6,403,509 B2 | 6/2002 | Cochran et al. |
| 6,413,893 B1 | 7/2002 | Shelestak et al. |
| 6,498,118 B1 | 12/2002 | Landa et al. |
| 6,521,558 B2 | 2/2003 | Landa et al. |
| 6,573,207 B2 | 6/2003 | Landa et al. |
| 6,716,780 B2 | 4/2004 | Landa et al. |
| 6,764,973 B2 | 7/2004 | Berthereau et al. |
| 6,784,129 B2 | 8/2004 | Seto et al. |
| 2002/0160901 A1 | 10/2002 | Landa et al. |
| 2003/0148869 A1 | 8/2003 | Berthereau et al. |
| 2004/0038799 A1 | 2/2004 | Landa et al. |
| 2004/0110624 A1 | 6/2004 | Hulme et al. |
| 2004/0116271 A1 | 6/2004 | Thomsen et al. |
| 2004/0171473 A1 | 9/2004 | Teyssedre et al. |
| 2005/0020430 A1 | 1/2005 | Thomsen et al. |

FOREIGN PATENT DOCUMENTS

| | | |
|---|---|---|
| EP | 0 653 388 | 5/1995 |
| EP | 0 952 123 | 10/1999 |
| EP | 1 041 050 | 10/2000 |
| WO | WO 03/080527 | 10/2003 |

*Primary Examiner*—Jerry Lorengo
*Assistant Examiner*—Matthew E Hoban
(74) *Attorney, Agent, or Firm*—Nixon & Vanderhye P.C.

(57) ABSTRACT

A grey glass composition employing in its colorant portion, in certain example embodiments, iron, cobalt, nickel, and at least one of erbium and titanium. The use of erbium and/or titanium has been found to improve coloration of the grey glass, and improve tunability of the same. In certain example embodiments, the ratio of cobalt oxide to nickel oxide is from 0.22 to 0.30 in order to achieve desired coloration in certain example embodiments.

19 Claims, 1 Drawing Sheet

| | Dark Gray Glass, Examples | | | | |
|---|---|---|---|---|---|
| Chemical compound: | 1 | 2 | 3 | 4 | 5 |
| $SiO_2$ | 72.37 | 72.04 | 72.05 | 72.35 | 71.89 |
| $Na_2O$ | 12.96 | 13.05 | 13.07 | 12.98 | 13.14 |
| CaO | 9.17 | 9.43 | 9.40 | 9.17 | 9.45 |
| MgO | 3.74 | 3.83 | 3.81 | 3.74 | 3.83 |
| $Al_2O_3$ | 0.882 | 0.889 | 0.913 | 0.915 | 0.905 |
| $K_2O$ | 0.163 | 0.162 | 0.166 | 0.165 | 0.165 |
| $SO_3$ | 0.218 | 0.205 | 0.226 | 0.302 | 0.246 |
| $TiO_2$ | 0.215 | 0.123 | 0.031 | 0.027 | 0.032 |
| $Fe_2O_3$, % | 0.276 | 0.281 | 0.305 | 0.300 | 0.311 |
| $Co_3O_4$, ppm | 210 | 210 | 197 | 202 | 195 |
| $Cr_2O_3$, ppm | 7 | 7 | 6 | 7 | 5 |
| NiO, ppm | 704 | 706 | 850 | 830 | 780 |
| $Er_2O_3$, % | 0.56 | 0.26 | 0 | 0 | 0 |
| Spectral data at 0.219": | | | | | |
| %Lt (D65) | 18.12 | 17.11 | 17.71 | 16.69 | 18.03 |
| %TS (ISO 9050) | 34.78 | 33.76 | 33.61 | 34.21 | 35.20 |
| %IR | 39.88 | 38.79 | 39.27 | 40.07 | 40.76 |
| Ltc(Y) | 19.53 | 17.18 | 17.73 | 17.17 | 18.31 |
| x | 0.2961 | 0.2925 | 0.2993 | 0.2927 | 0.2943 |
| y | 0.3124 | 0.3094 | 0.3175 | 0.3166 | 0.3178 |
| Dom. Wave | 488.51 | 489.21 | 492.91 | 491.89 | 492.18 |
| Ex.purity | 3.55 | 6.84 | 6.09 | 6.35 | 5.74 |
| %FeO | 0.0837 | 0.0898 | 0.0848 | 0.0803 | 0.078 |
| $L^*$ (D65) | 50.01 | 48.91 | 49.03 | 48.49 | 50.03 |
| $a^*$ | -2.35 | -2.91 | -2.24 | -2.40 | -3.05 |
| $b^*$ | -3.41 | -3.72 | -4.02 | -2.78 | -2.37 |
| Melt# | 4-187 | 4-188 | 4-203A | 4-194 | 4-195 |

Fig. 1

GREY GLASS COMPOSITION

This invention relates to, for example, dark grey glass compositions and methods of making the same. Such glass compositions are useful, for example and without limitation, in architectural and/or residential glass window applications.

BACKGROUND OF THE INVENTION

A glass window or other glass article is said to have the desirable color "grey" when it has a dominant wavelength of from 435 nm to 570 nm (this dominant wavelength range defines the color "grey" herein).

While glass having "grey" color is often desirable, as explained above there sometimes also exists a need or desire to achieve certain levels of x and y color values, and sometimes of light transmission defined conventionally by:

Lta as visible light transmission,
UV as ultraviolet light transmission, and
IR as infrared light transmission.

Glass thickness ranges of from about 1-6 mm, more preferably from about 3-4 mm, are typically used when measuring the aforesaid characteristics. These thickness ranges are generally recognized as conventional thicknesses for glass sheets made by the float glass process.

Certain grey glasses achieve their desired grey coloration by using a combination of selenium (Se) and chromium (Cr) oxide colorants. For example, see U.S. Pat. Nos. 5,877,103 and 5,728,471. However, the use of significant amounts of Se and/or Cr is not always desirable. For purposes of example only and without limiting any claim in any way, raw materials used to intentionally introduce chromium into glass batches can sometimes be difficult to melt and may lead to chromite defects in certain situations. Moreover, for purposes of example only and without limiting any claim in any way, the amount of Se that is retained in a glass from the batch to the final glass product (i.e., Se retention) may vary from day to day, or week to week, depending on processing parameters thereby leading to possible color variations.

In view of the above, while trace amounts of chromium and/or Se may end up in a final glass product, there exists a need in the art to make a soda-lime-silica based glass which can achieve desired grey color while primarily relying on colorants other than Se and/or Cr. While trace amounts of Se and/or Cr may end up in the glass, there is a need to create a glass which can achieved desired grey coloration while minimizing the amounts of one or both of these materials.

Other have tried to make grey glass without using significant amounts of Se and/or Cr. For example, a known glass believed to be sold by St. Gobain has a colorant portion of 0.364% total iron, 199 ppm $Co_3O_4$, 8 ppm $Cr_2O_3$, and 780 ppm NiO. Likewise, another known glass believed to be sold by Asahi has a colorant portion of 0.198% total iron, 189 ppm $Co_3O_4$, 11 ppm $Cr_2O_3$, and 829 ppm NiO. The St. Gobain glass achieves a visible transmission of about 16% (at 0.219 inches thickness), desired grey x and y color values of 0.2929 and 0.3121, a dominant wavelength of 488, an excitation purity of 6.75 and a % FeO of 0.1053. The Asahi glass achieves a visible transmission of about 16% (at 0.219 inches thickness), desired grey x and y color values of 0.2932 and 0.3084, a dominant wavelength of 485, an excitation purity of 6.99 and a % FeO of 0.0857. While these glasses achieved desired grey coloration, they are typically difficult to fine-tune with respect to coloration. In a manner, see U.S. Pat. No. 6,764,973, which is similarly flawed.

It is noted that the instant inventors have used erbium oxide in grey glasses. For example, see U.S. Pat. Nos. 6,521,558 and 6,573,207, which are hereby incorporated herein by reference. However, the erbium oxide used in these patents (i.e., '558 and '207 patents) is used in combination with substantial amounts of Se in order to achieve desired coloration. As explained above, the use of significant amounts of Se is not always desirable.

In view of the above, it will be apparent that there exists a need in the art for a soda-lime-silica based glass which can achieve desired grey color while primarily relying on colorants other than Se and/or Cr, and which uses colorants which permit color to be more easily fine-tuned.

SUMMARY OF EXAMPLE EMBODIMENTS OF THE INVENTION

In certain example embodiments of this invention, there is provided a grey glass comprising: a base glass portion comprising:

| Ingredient | wt. % |
|---|---|
| $SiO_2$ | 67-75% |
| $Na_2O$ | 10-20% |
| CaO | 5-15% |
| MgO | 0-7% |
| $Al_2O_3$ | 0-7% |
| $K_2O$ | 0-7% | and a colorant portion comprising, or consisting essentially of:

| | |
|---|---|
| total iron (expressed as $Fe_2O_3$) | 0.15 to 0.45% |
| selenium | <=3 ppm |
| chromium oxide | <=12 ppm |
| cobalt oxide | 130-240 ppm |
| nickel oxide | 500-1,000 ppm |
| titanium oxide | 0 to 0.20% |
| erbium oxide | 0 to 1.0% | wherein the grey glass has a visible transmission of from about 8-25%, an x color value of from 0.284 to 0.300, a y color value of from 0.300 to 0.327, and a dominant wavelength of from 435-570 nm; and wherein the grey glass includes one or both of: (a) erbium oxide from 0.1 to 0.8%, and (b) titanium oxide from 0.01 to 0.10%. In certain example embodiments, the ratio of cobalt oxide/nickel oxide is from 0.22 to 0.30.

It has been found that the addition of an oxide of erbium and/or titanium to the grey glass composition including the aforesaid components permits the color of the glass to be fine-tuned to a more desirable color value. Thus, the use of an oxide of erbium and/or titanium in this particular grey glass composition provides for unexpected results.

In other example embodiments of this invention, there is provided a grey glass comprising:

| | |
|---|---|
| total iron (expressed as $Fe_2O_3$) | 0.15 to 0.45% |
| selenium | <=3 ppm |
| chromium oxide | 2-12 ppm |
| cobalt oxide | 130-240 ppm |
| nickel oxide | 500-1,000 ppm |
| titanium oxide | 0 to 0.20% |
| erbium oxide | 0 to 1.0% | wherein the grey glass has a visible transmission of from about 8-25%, an x color value of from 0.284 to 0.300, a y color value of from 0.300 to 0.327, and a dominant wavelength of from 435-570 nm; wherein a ratio of cobalt oxide/nickel oxide is from 0.22 to 0.30; and wherein the grey glass includes one or both of: (a) erbium oxide from 0.1 to 0.8%, and (b) titanium oxide from 0.01 to 0.10%.

IN THE DRAWINGS

FIG. 1 is a chart listing the compositions and spectral characteristics of Examples 1-5.

DETAILED DESCRIPTION OF CERTAIN EXAMPLE EMBODIMENTS OF THIS INVENTION

Grey glasses according to different embodiments of this invention may be used, for example, as windows in the automotive industry (e.g., windshields, backlites, sidelites, etc.), in architectural applications, and/or in other suitable applications.

Certain glasses according to this invention utilize soda-lime-silica glass as their base composition/glass, to which are added certain ingredients making up a unique colorant portion. An example soda-lime-silica base glass according to certain embodiments of this invention, on a weight percentage basis, includes the following basic ingredients:

TABLE 1

| Example Base Glass | |
|---|---|
| Ingredient | Wt. % |
| $SiO_2$ | 67-75% |
| $Na_2O$ | 10-20% |
| CaO | 5-15% |
| MgO | 0-7% |
| $Al_2O_3$ | 0-7% |
| $K_2O$ | 0-7% |

Other minor ingredients, including various refining aids, such as salt cake, crystalline water and/or the like may also be included in the base glass. In certain embodiments, for example, glass herein may be made from batch raw materials silica sand, soda ash, dolomite, limestone, with the use of salt cake ($SO_3$) as a refining agent. Reducing agent(s) such as Si (metallic) (Si), silicon monoxide (SiO), sucrose, and/or carbon may also be used. In certain instances, soda-lime-silica base glasses herein include by weight from about 10-15% $Na_2O$ and from about 6-12% CaO. While a soda-lime-silica base glass set forth above is preferred in certain embodiments of this invention, this invention is not so limited. Thus, other base glasses (e.g., borosilicate glass) may instead be employed in alternative embodiments.

In certain example embodiments of this invention, to the base glass (e.g., see Table 1 above) a colorant portion is added which causes the resulting glass to be grey in color (i.e., dominant wavelength of from 435 nm to 570 nm). In certain example embodiments of this invention, the colorant portion that is added to the base glass may either comprise the materials in Table 2 below, or consist essentially of the materials in Table 2 below.

TABLE 2

| | Example Colorant Portion | | |
|---|---|---|---|
| Ingredient | Preferred | More Preferred | Most Preferred |
| Total iron (expressed as $Fe_2O_3$): | 0.15 to 0.45% | 0.20 to 0.40% | 0.25 to 0.35% |
| Chromium oxide (e.g., $Cr_2O_3$): | <=12 ppm | <=10 ppm | <=7 ppm |
| Selenium (Se): | <=3 ppm | <=2 ppm | <=0 or 1 ppm |
| Cobalt oxide (e.g., $Co_3O_4$): | 130-240 ppm | 150-210 ppm | 160-200 ppm |
| Nickel Oxide (e.g., NiO): | 500-1,000 ppm | 550-900 ppm | 600-850 ppm |
| Titanium oxide (e.g., $TiO_2$): | 0 to 0.3% | 0.01 to 0.15% | 0.02 to 0.05% |
| Erbium oxide % (e.g., $Er_2O_3$): | 0 to 1.0% | 0.1 to 0.9% | 0.2 to 0.8% |
| Glass Redox (FeO/$Fe_2O_3$): | 0.20 to 0.40 | 0.25 to 0.35 | 0.26 to 0.30 |
| Ratio of $Co_3O_4$/NiO: | 0.22 to 0.30 | 0.24 to 0.29 | 0.25 to 0.28 |

In certain example embodiments, the amount of chromium oxide is from 1-20 ppm, more preferably from 2-12 ppm, and most preferably from 2-10 ppm.

However, it should be appreciated that small amounts of other materials (e.g., refining aids, melting aids, and/or impurities) may be present in the glass such as chromium, manganese, molybdenum, tin, chlorine, zinc, zirconium, Si, sulfur, fluorine, lithium and strontium, without taking away from the purpose(s) and/or goal(s) of the instant invention. Moreover, in certain example instances, from 0 to 0.3% erbium oxide (sometimes from 0.00001 to 0.2%) may be provided in the glass.

It has been found that the addition of an oxide of erbium and/or titanium to the grey glass composition including the aforesaid components permits the color of the glass to be fine-tuned to a more desirable color value. Thus, the use of an oxide of erbium and/or titanium in this particular grey glass composition provides for unexpected results as color and tunability can be improved. The use of one or both of an oxide of erbium and/or titanium permits the color to be moved closer to a hypothetical non-limiting target of x=about 0.296 and y=about 0.313.

In certain example embodiments, the glass is free of, or substantially free of (i.e., less than 0.0001 or 0.0002%), one, two or three of cerium oxide, selenium, and/or chromium oxide.

The aforesaid colorant portion allows desirable grey color to be achieved, while at the same time permitting a glass composition to be provided that is easily color tunable, and while possibly maintaining satisfactory solar performance properties including high visible transmission coupled with low IR (infrared) and low UV (ultraviolet) transmittance.

In certain example embodiments herein, glasses may be characterized by one or more of the optical characteristics set forth below when measured at a nominal thickness of from 1-6 mm, more preferably from about 3-4 mm (about 3 or 4 mm may be used for a reference thickness in certain example non-limiting embodiments, or about 0.219 inch thickness of glass may be used). The color values are transmissive, in accordance with the known x/y CIE color diagram.

TABLE 3

Example Optical Characteristics

| Characteristic | Preferred | More Preferred | Most Preferred |
|---|---|---|---|
| Lta (visible transmittance): | 8-25% | 10-20% | 12-18% |
| $IR_{transmission}$ (% IR): | 30-40% | 32-39% | 34-38% |
| % TS (total solar): | 25-40% | 26-39% | 28-36% |
| Dominant Wavelength (λ): | 435-570 nm | 470-510 nm | 480-500 nm |
| Excitation Purity (Pe): | <=8 | <=7 | <=6 |
| x (color value): | 0.284-0.300 | 0.286-0.299 | 0.290-0.297 |
| y (color value): | 0.300-0.327 | 0.304-0.323 | 0.310-0.322 |

The "grey" color, especially in the area of the CIE color chart define by the x and y color values listed above, is highly desirable in certain example applications, and the use of erbium and/or titanium in combination with substantially no Cr and/or Se is advantageous as explained above.

The total amount of iron present in the glass, and thus in the colorant portion thereof, is expressed herein in terms of $Fe_2O_3$ in accordance with standard practice. This, however, does not imply that all iron is actually in the form of $Fe_2O_3$. Likewise, the amount of iron in the ferrous state is reported herein as FeO, even though all ferrous state iron in the glass may not be in the form of FeO. The proportion of the total iron in the ferrous state (i.e., FeO) is used to determine the redox state of the glass (i.e., glass redox), which is expressed as the ratio $FeO/Fe_2O_3$, which is the weight percentage (%) of iron in the ferrous state (expressed as FeO) divided by the weight percentage (%) of total iron (expressed as $Fe_2O_3$). Thus, $Fe_2O_3$ herein means total iron and FeO means iron in the ferrous state. Iron in the ferrous state ($Fe^{2+}$; FeO) is a blue-green colorant, while iron in the ferric state ($Fe^{3+}$) is a yellow-green colorant. According to certain embodiments of this invention, the colorant portion of the glass composition herein is characterized by a glass redox value (i.e., $FeO/Fe_2O_3$) of at least 0.30, more preferably at least 0.34 and most preferably at least 0.38. It is noted that in different embodiments of this invention iron may be added to the glass batch during the manufacturing process in any suitable form (e.g., via rouge and/or melite).

Glass according to certain embodiments of this invention is often made via the known float process in which a tin bath is utilized. It will thus be appreciated by those skilled in the art that as a result of forming the glass on molten tin in certain example embodiments, small amounts of tin or tin oxide may migrate into surface areas of the glass on the side that was in contact with the tin bath during manufacture (i.e., typically, float glass may have a tin oxide concentration of 0.05% or more (wt.) in the first few microns below the surface that was in contact with the tin bath).

Cobalt (Co) is a blue colorant. It is believed that much of the cobalt in the glass is in the oxide state of $Co_3O_4$. However, other oxide states of CoO are also possible in glasses according to this invention. Thus, unless expressly stated to the contrary, the terms "cobalt oxide", "CoO" and "$Co_3O_4$" as used herein include not only cobalt in this/these particular oxide state(s), but also include(s) cobalt which may be present in other oxide or non-oxide state(s).

Erbium (Er) is a pink colorant. It is believed that much of the erbium in the glass is in the oxide state of $Er_2O_3$. However, other oxide states of erbium may also be possible in glasses. Thus, unless expressly stated to the contrary, the terms "erbium oxide" and "$Er_2O_3$" as used herein include not only erbium in this/these particular oxide state(s), but also include(s) erbium which may be present in other oxide or non-oxide state(s).

Titanium oxide (e.g., $TiO_2$) is an absorber of blue, and thus may provide yellowish coloration. The use of titanium oxide is advantageous in that it is a weak visible absorber which helps lower UV transmission, and also helps permit desired coloration to be achieved. Different oxide states of Ti are possible in glass. Thus, unless expressly stated to the contrary, the terms "titanium oxide" and "$TiO_2$" as used herein include not only Ti in this/these particular oxide state(s), but also include(s) Ti which may be present in other oxide or non-oxide state(s).

Nickel (e.g., in the form of NiO) is a orange/red/brown type colorant, and as used in glasses herein helps the glasses to achieve desired coloration. As with the other above, unless expressly stated to the contrary, the terms "nickel", "nickel oxide" and "NiO" as used herein include not only Ni in this/these particular oxide state(s), but also include(s) Ni which may be present in other oxide or non-oxide state(s).

EXAMPLES

The glasses of certain example embodiments of this invention may be made from batch ingredients using well known glass melting and refining techniques once given the above final glass analysis. Experimental glass melts were made in platinum crucibles using a standard electric melting furnace set-up for soda-lime-silica glass compositions, that is, a melting temperature of about 1500 degrees C., a melting time of about 4 hours in air medium, an annealing temperature of about 620 to 680 degrees C., an annealing time of about 0.5 hours, and a cool down to room temperature by inertia after annealing furnace shut-down. The glass was cast into graphite molds, annealed and cooled down, then ground and polished for visual evaluation. The respective compositions and spectral data of Examples 1-5 are set forth in FIG. 1.

For example, the terms, and characteristics, of ultraviolet light transmittance (% UV), infrared energy transmittance (% IR), total solar transmittance (% TS), dominant wavelength (DW) and excitation purity (i.e. % "purity", or Pe) are also well understood terms in the art, as are their measurement techniques. Such terms are used herein, in accordance with their well known meaning. Dominant wavelength (DW) may be calculated and measured conventionally in accord with the aforesaid CIE Publication 15.2 (1986) and ASTM: E 308-90. The term "dominant wavelength" includes both the actual measured wavelength and, where applicable, its calculated complement. Excitation purity (Pe or % "purity") may be measured conventionally in accordance with CIE Publication 15.2 (1986) and ASTM: E 308-90.

Once given the above disclosure many other features, modifications and improvements will become apparent to the skilled artisan. Such features, modifications and improvements are therefore considered to be a part of this invention, the scope of which is to be determined by the following claims:

What is claimed is:

1. A grey glass comprising:
a base glass portion comprising:

| Ingredient | wt. % |
|---|---|
| $SiO_2$ | 67-75% |
| $Na_2O$ | 10-20% |
| CaO | 5-15% |
| MgO | 0-7% |
| $Al_2O_3$ | 0-7% |
| $K_2O$ | 0-7% | and a colorant portion consisting essentially of:

| total iron (expressed as $Fe_2O_3$) | 0.15 to 0.45% |
|---|---|
| selenium | <=3 ppm |
| chromium oxide | 1-20 ppm |
| cobalt oxide | 130-240 ppm |
| nickel oxide | 500-1,000 ppm |
| titanium oxide | 0 to 0.20% | wherein the grey glass has a redox value ($FeO/Fe_2O_3$) of from about 0.20 to 0.40, a visible transmission of from about 8-25%, an x color value of from 0.284 to 0.300, a y color value of from 0.300 to 0.327, and a dominant wavelength of from 435-570 nm;
wherein a ratio of cobalt oxide/nickel oxide is from 0.22 to 0.30; and
wherein the grey glass includes erbium oxide from 0.1 to 0.8%.

2. The glass of claim 1, wherein the glass comprises erbium oxide from 0.2 to 0.7%.

3. The glass of claim 1, wherein the glass comprises $TiO_2$ from 0.01 to 0.20%.

4. The glass of claim 1, wherein the glass comprises $TiO_2$ from 0.02 to 0.05%.

5. The glass of claim 1, wherein the glass has a visible transmission of from 12-18%.

6. The glass of claim 1, wherein the glass has an x color value of from 0.286 to 0.299, a y color value of from 0.304 to 0.323, and a dominant wavelength of from 470-510 nm.

7. The glass of claim 1, wherein the glass has an x color value of from 0.290 to 0.297, and a y color value of from 0.310 to 0.322.

8. The glass of claim 1, wherein the glass has a redox of from 0.26 to 0.30.

9. The glass of claim 1, wherein the ratio of cobalt oxide/nickel oxide is from 0.24 to 0.29.

10. The glass of claim 1, wherein the ratio of cobalt oxide/nickel oxide is from 0.25 to 0.28.

11. The glass of claim 1, wherein the colorant portion consists essentially of, in addition to the erbium oxide:

| total iron (expressed as $Fe_2O_3$) | 0.2 to 0.4% |
|---|---|
| selenium | <=2 ppm |
| chromium oxide | 2-10 ppm |
| cobalt oxide | 150-210 ppm |
| nickel oxide | 550-900 ppm. |

12. The glass of claim 1, wherein the glass is substantially free of cerium oxide, and includes less than 1 ppm of Se and/or no Se.

13. A grey glass comprising:
a base glass portion comprising:

| Ingredient | wt. % |
|---|---|
| $SiO_2$ | 67-75% |
| $Na_2O$ | 10-20% |
| CaO | 5-15% |
| MgO | 0-7% |
| $Al_2O_3$ | 0-7% |
| $K_2O$ | 0-7% | and a colorant portion comprising:

| total iron (expressed as $Fe_2O_3$) | 0.15 to 0.45% |
|---|---|
| selenium | <=3 ppm |
| chromium oxide | 2-12 ppm |
| cobalt oxide | 130-240 ppm |
| nickel oxide | 500-1,000 ppm |
| titanium oxide | 0 to 0.20% | wherein the grey glass has a visible transmission of from about 8-25%, an x color value of from 0.284 to 0.300, a y color value of from 0.300 to 0.327, and a dominant wavelength of from 435-570 nm; and
wherein the grey glass includes erbium oxide from 0.1 to 0.8%.

14. The glass of claim 13, wherein a ratio of cobalt oxide/nickel oxide is from 0.22 to 0.30.

15. The glass of claim 13, wherein the glass comprises erbium oxide from 0.2 to 0.7%.

16. The glass of claim 13, wherein the glass comprises $TiO_2$ from 0.01 to 0.20%.

17. The glass of claim 13, wherein the glass comprises $TiO_2$ from 0.02 to 0.05%.

18. The glass of claim 13, wherein the glass has an x color value of from 0.286 to 0.299, a y color value of from 0.304 to 0.323, and a dominant wavelength of from 470-510 nm.

19. A grey glass comprising:

| total iron (expressed as $Fe_2O_3$) | 0.15 to 0.45% |
|---|---|
| selenium | <=3 ppm |
| chromium oxide | 1-20 ppm |
| cobalt oxide | 130-240 ppm |
| nickel oxide | 500-1,000 ppm |
| titanium oxide | 0 to 0.20% | wherein the grey glass has a visible transmission of from about 8-25%, an x color value of from 0.284 to 0.300, a y color value of from 0.300 to 0.327, and a dominant wavelength of from 435-570 nm;
wherein a ratio of cobalt oxide/nickel oxide is from 0.22 to 0.30; and
wherein the grey glass includes erbium oxide from 0.1 to 0.8%.

* * * * *